United States Patent [19]

Schwarz et al.

[11] 3,910,654

[45] Oct. 7, 1975

[54] BEARING CONSTRUCTION FOR TILTABLE CONVERTERS

[75] Inventors: Walter Schwarz, Linz; Ernst Riegler, Enns; Manfred Schmidt, Linz, all of Austria

[73] Assignee: Vereinigte Osterreichische Eisen- und Stahlwerke - Alpine Montan Aktiengesellschaft, Linz, Austria

[22] Filed: June 7, 1974

[21] Appl. No.: 477,175

[30] Foreign Application Priority Data
June 20, 1973  Austria .............................. 5411/73

[52] U.S. Cl. ................................. 308/72; 266/36 P
[51] Int. Cl.² .......................................... C21C 5/50
[58] Field of Search ......... 308/36.1, 72, 61; 266/35, 266/36 R, 36 P

[56] References Cited
UNITED STATES PATENTS

| | | | |
|---|---|---|---|
| 3,290,897 | 12/1966 | Kuehn | 308/72 X |
| 3,291,541 | 12/1966 | Dellinger | 266/36 P X |
| 3,771,777 | 11/1973 | Fisher et al. | 266/36 P |
| 3,838,849 | 10/1974 | Alexander et al. | 266/36 P |

Primary Examiner—M. Henson Wood, Jr.
Assistant Examiner—Michael Mar
Attorney, Agent, or Firm—Brumbaugh, Graves, Donohue & Raymond

[57] ABSTRACT

The present invention relates to a bearing construction for tiltable converters. In this construction turning and supporting trunnions are borne in bearing housings of bearings, that accommodate angular and tumble movements, respectively. These bearings may be sliding bearings, ball and socket- bearings or roller bearings. One bearing housing is mounted on a stationary support and the other one is mounted on a link support, the link support being connected articulately to the bearing housing. A connecting rod, arranged parallel in relation to the link support is also articulately connected to the bearing housing.

9 Claims, 5 Drawing Figures

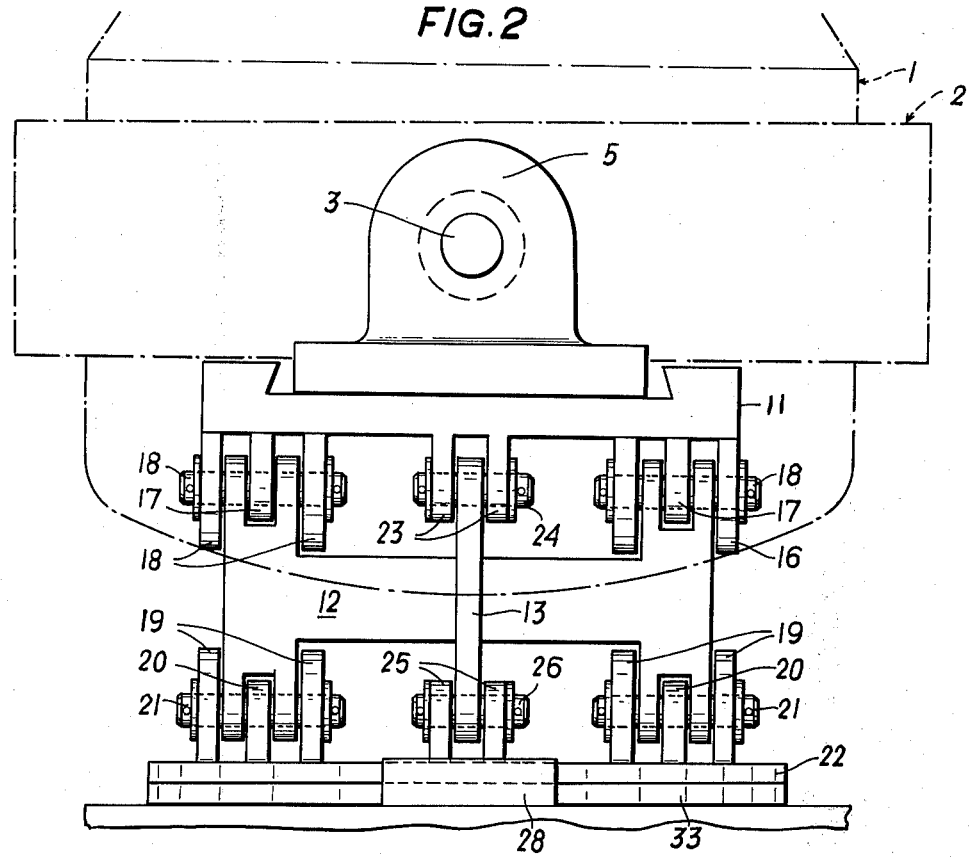
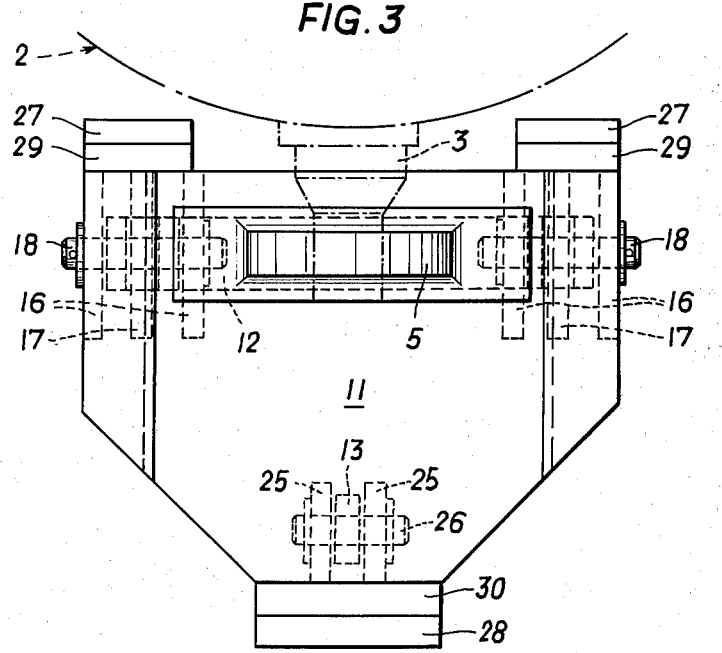

BEARING CONSTRUCTION FOR TILTABLE CONVERTERS

BACKGROUND OF THE INVENTION

The invention relates to a bearing construction for tiltable converters with turning and supporting trunnions, respectively, which lie opposite each other and are borne in bearings, e.g. sliding-, ball and socket-, or roller bearings. The bearings accomodate angular or tumble movements, respectively, and are enclosed in bearing housings. One bearing housing is secured on a stationary support and the other bearing housing is mounted on a link support.

The bearing construction of a converter for the production of steel has to meet considerable demands, on account of the high and fluctuating temperatures to which the converter and the carrying ring are subjected. The bearings of the turning and supporting trunnions, respectively, have to be capable of accommodating loads heavier than 1000 metric tons, the diameters of the trunnions often measuring 600 mm or more. Since the supporting trunnions often take an inclined position, the bearings must be able to accommodate tumble and angular movements of the trunnions. Finally, the bearings must also be capable of following longitudinal displacements, which, according to the respective converter size or supporting trunnion distance, respectively, may amount to more than 100 mm, for which reason the one bearing on the drive side of the converter is constructed as a so-called "fixed bearing" and the other bearing is constructed as a so-called "loose bearing."

For the construction of the loose bearing, various possibilities have been proposed. In U.S. Pat. No. 3,291,541, a loose bearing construction has been described, in which the axial movement of the supporting trunnion is accommodated by linear roller bearings, arranged below the bearing housing. According to U.S. Pat. No. 2,976,090, at either side of the loose bearing, plane sliders are provided, which rest on a support, roll bodies being interposed in an expansion housing. So as to avoid axially displacing the entire bearing construction according to Austrian Pat. No. 274,870, the outer ring of the loose bearing is borne in a sliding bushing, which is axially displaceable in relation to the housing, enclosing the entire bearing, the housing itself remaining stationary. These known loose bearing constructions have the disadvantage that they are constructed entirely different from fixed bearing constructions, which is not advantageous in the case of damages and which additionally increases the cost of spare parts.

Another known construction which contributes to the solution of the problem is the use of a link support below the loose bearing, according to U.S. Pat. No. 3,195,875. A bearing which accommodates angular and tumble movements is rigidly fixed on a long link support in such a way that at an expansion of the carrying ring or at the occurrence of an axial shift on the side of the loose bearing, the bearing as a whole, together with the link support swings out about a center of rotation, lying at the lower end of the link support. With large converters, where the axial shift may be very strong, the outer ring of this bearing has to be very wide, wider than at the opposite fixed bearing side, so as to ensure the accommodation of the inclined position of the loose bearing by the angle ($\alpha - \beta$), where $\alpha$ is the inclination angle of the link support in relation to the vertical and $\beta$ is the inclination angle of the supporting trunnion axis in relation to the horizontal - caused by the lowering of the bearing center, when the link support swings out. When dimensioning the loose bearing, not only the angles $\alpha$ and $\beta$, which depend upon the strength of the axial shift, the length of the link support and the distance between fixed bearing, and loose bearing have to be taken into consideration, but additionally, an angle deviation, caused by the thermal effect and by a plastic deformation of the supporting trunnions, respectively. As both influences overlap, for safety reasons the outer ring of the bearing on the loose bearing side has to be dimensioned sufficiently wide, so that again a constructional deviation from the fixed bearing construction is present.

SUMMARY OF THE INVENTION

The invention aims at avoiding these disadvantages and difficulties and its object is to use, in a bearing construction, provided with a link support, both on the loose bearing side, and on the fixed bearing side identical bearings which have to accommodate only angular and tumble movements, but no axial displacements within the bearing construction itself.

In a construction of the above described type, this object is achieved in that the link support is connected articulately with the bearing housing and with a connecting rod, arranged parallel in relation to the link support. By hinging the link support to the bearing and the bearing housing, respectively, and by using a connecting rod, there is a parallel displacement of the bearing on the loose bearing side, when an axial shift in direction of the axis of the supporting trunnion occurs. The bearing only has to additionally accommodate the angle deviation of the supporting trunnion axis, caused by the displacement of the bearing center. The swivel angle $\alpha$ of the link support and of the connecting rod, respectively, need not be taken into consideration.

A preferred embodiment of the invention consists in that the link support and the connecting rod are hinged at their upper ends to a support plate, on which the bearing housing is rigidly mounted.

It is a further feature of the invention that the link support and the connecting rod are hinged at their lower ends to a support plate, horizontally displaceable in relation to a foundation plate.

BRIEF DESCRIPTION OF THE DRAWINGS

The invention will now be illustrated in more detail with reference to the accompanying drawings.

FIG. 2 shows, on a larger scale, a side view, drawn in direction "A" of FIG. 1, onto the loose bearing side of the converter.

FIG. 3 is a horizontal projection pertaining to FIG. 2.

DETAILED DESCRIPTION

Figure 1:
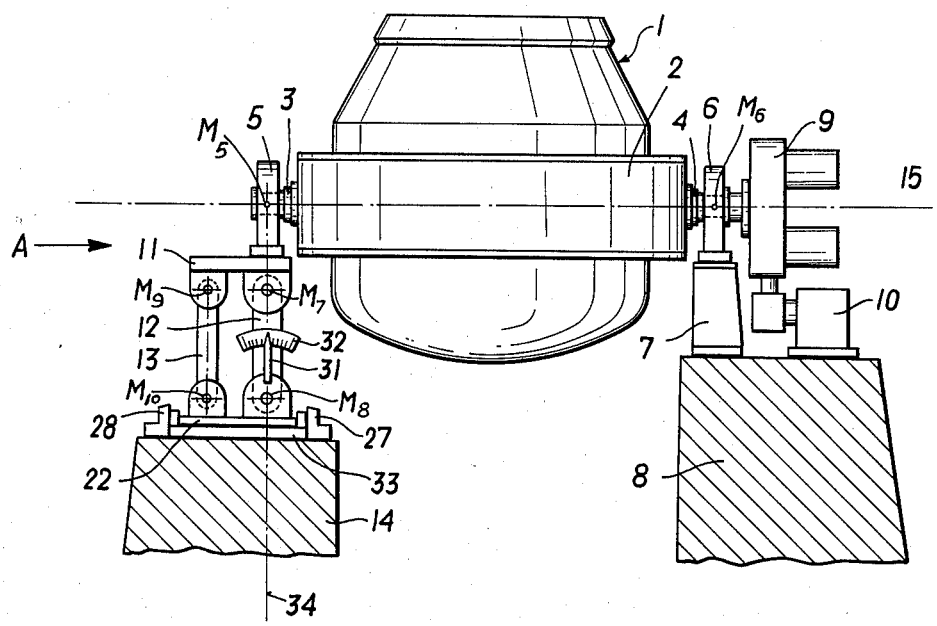
FIG. 1 is a side view of a converter construction according to the invention.

In FIG. 1, 1 denotes a tiltable converter for carrying out an oxygen refining process, which converter is surrounded by a carrying ring 2. To the carrying ring 2 supporting trunnions 3, 4 are secured, which are borne rotatably in two equally constructed bearings 5, 6. The bearing 6 on the drive side of the converter, which usually is the fixed bearing side, is rigidly mounted on a support 7, connected stationarily with the foundation 8. 9 denotes an attachable gear with drive motors, the gear being secured to the trunnion 4 and positioned in circumferential direction by a torque support 10, in relation to the foundation 8. The bearing 5 on the loose bearing side is rigidly mounted with its housing on a support plate 11. Onto this support plate 11 a link support 12 and a connecting rod 13 of equal length and arranged in parallel relation to the link support are hinged. The link support 12 and the connecting rod 13 are, at their lower ends, arranged articulately in relation to the foundation 14 in a manner, which will be described more precisely below. The axis 34 of the link support 12 is in alignment with the vertical axis of the bearing 5, and encloses, when installed, a right angle with the supporting trunnion axis 15. The axis 15, running through the bearing centers $M_5$, $M_6$, crosses the axis 34, running through the centers of rotation $M_7$, $M_8$ of the link support 12, in $M_5$, and the centers of rotation $M_9$, $M_{10}$ of the connecting rod 13 lie on an axis parallel to the axis 34. Thus, the link support 12 and the connecting rod 13 are not hinged directly to the foundation 14, but to a support plate 22, which is horizontally displaceable in relation to a foundation plate 33 between stops 27, 28.

From FIGS. 2 and 3, the way of mounting the connecting rod 13 and the link support 12 on the support plates 11 and 22 can be observed. For this purpose, on the underside of the support plates 11, shackles 16, 17 and bolts 18, and, on the upper side of the support plate 22, corresponding shackles 19, 20 and bolts 21 are provided for the articulate mounting of the link support 12, that has the form of an "H". Shackles 23, 25 and bolts 24, 26 are provided for articulate mounting of the connecting rod 13. The support plate 22 is fixed in its position between the stops 27 and 28 by means of distance pieces 29, 30 for pieces of different size and after exchanging the distance pieces 29, 30 the support plate 22 may be adjusted (displaced) in relation to the stationary foundation plate 33 for the purpose of displacing the link support axis 34 in the direction of the supporting trunnion axis 15. In order to be able to check the axial shift of the supporting trunnions 3, 4 and the swing path of the link support 12, respectively, on one of the shackles 19, an indicator 31 and, on the front side of the link support 12, a graduation 32 with the corresponding markings for maximumly permissible deflection of the link support 12, are mounted. When the deflection becomes too strong, the support plate 22 may be reset by using smaller or bigger distance pieces 29, 30, after previously supporting the converter 1 and relieving the link support 12.

Figure 4:
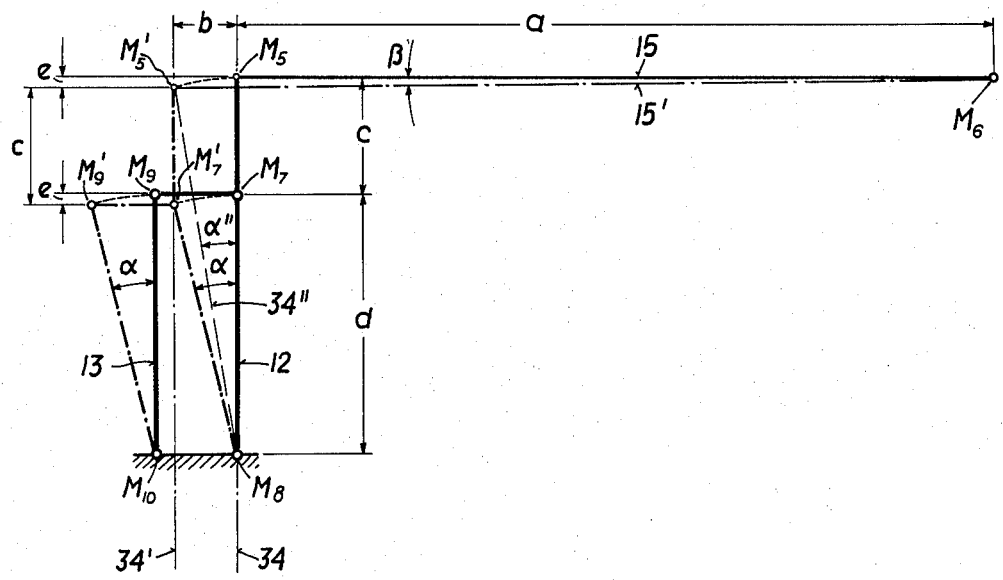
FIG. 4 is a schematic illustration of the kinematics of an axial shift in direction of the axis of the supporting trunnion.

FIG. 4 illustrates the alteration of the centers $M_5$, $M_7$ and $M_9$ in the construction according to the invention, when the distance $a$ between the bearing centers $M_5$, $M_6$, which lies in the range of 9 to 11 m, enlarges by the distance $b$ on account of thermal expansion. In steel works converters with large bearing distances, $b$ may measure approx. 100 mm. $c$ is the constructionally conditioned, constant distance between $M_5$ and the upper center of rotation $M_7$ of the link support 12 and $d$ is the length of the link support between $M_7$ and the lower center of rotation $M_8$. $d$ is to be kept as small as possible, so that the link support need not be constructed too heavy. $d$ lies in the range between 1000 and 2000 mm. If now, as a consequence of the axial shift, the link support 12 and the connecting rod 13 swing out by the angle $\alpha$ to $b$, the centers $M_5$, $M_7$, $M_9$ lower by the distance $e$ to $M_5'$, $M_7'$, $M_9'$, and the supporting trunnion axis 15 shifts by the angle $\beta$ to 15', while the vertical axis 34' through the bearing 5 is shifted only parallel to the axis 34. When $d$ measures 1000 mm, $\alpha$ amounts to 5° 41' and $e$ to about 5 mm; when, however, $d$ measures 2000 mm, $\alpha$ amounts to 2° 52' and $e$ to approx. 1.2 mm. Correspondingly for values of $d$ at a length $a$ measuring 9 m, the angle $\beta$ amounts to approx. 1' 54" to 0' 28", respectively, and when $a$ measures 11 m, $\beta$ lies in the range between 1'34" and 0' 23". In any case the angle $\beta$ is very small and the bearing 5 on the loose bearing side of the converter can accommodate without difficulties this displacement by the angle $\beta$ in addition to an inclination of the supporting trunnion 3 and inaccuracies occurring during installation.

Figure 5:
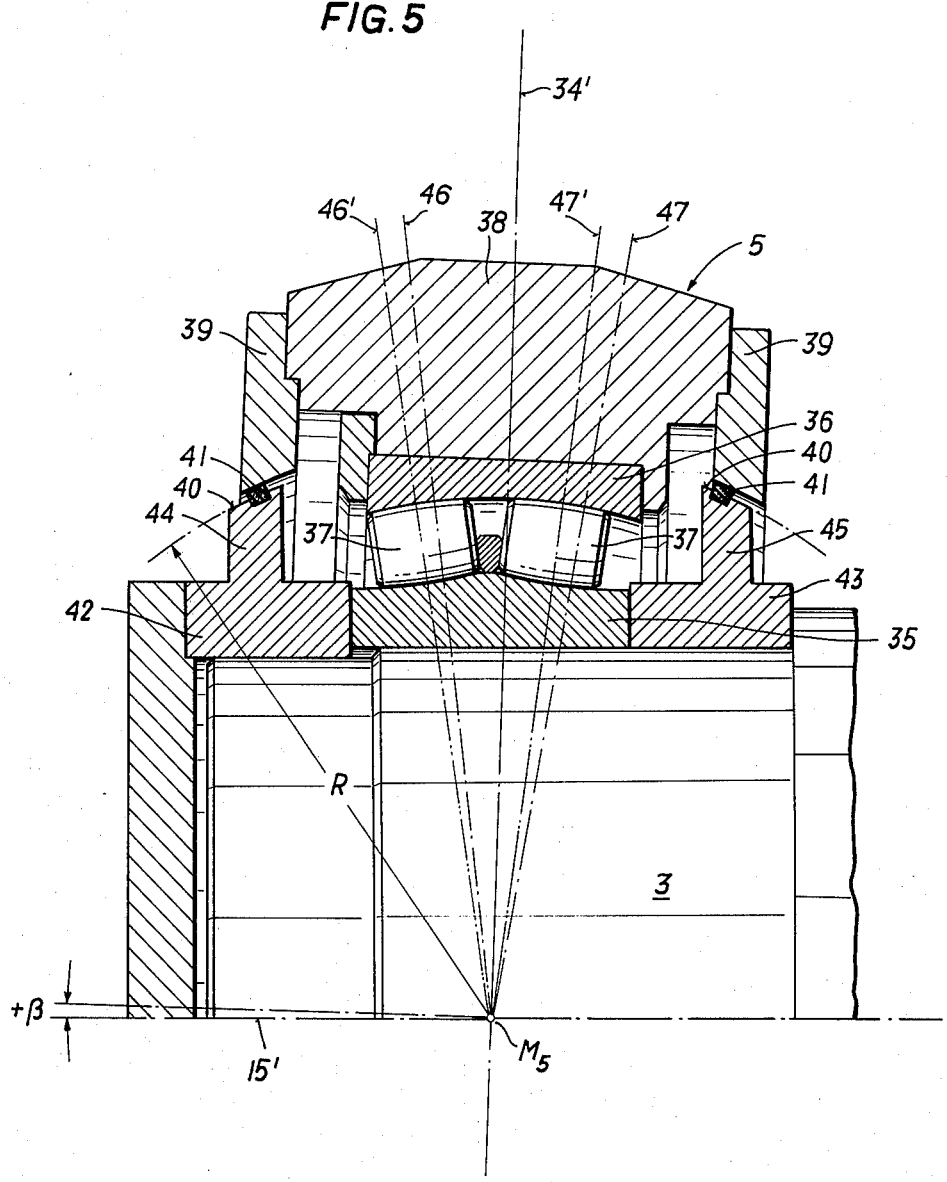
In FIG. 5, which shows on enlarged scale a longitudinal section through the upper part of the bearing on the loose bearing side, the relative motion of the bearing parts, occurring as a consequence of this shift is illustrated.

In FIG. 5, 35 denotes the inner ring of the bearing, secured to the supporting trunnion 3, 36 is the outer ring, having a ball-shaped rolling surface and in between rollers 37 are provided. The outer ring 36 is fixed in a housing lid 38 with lateral, ring-shaped housing lids 39. Between the housing lids 39 and flange-shaped attachments 44, 45 of distance rings 42, 43, fixing the inner ring 35, ball-shaped sealing surfaces 40, having the radius R and the center $M_5$, and ring-shaped sealings 41, inserted in between and consisting of plastics, rubber or the like, are provided, so as to prevent solid materials, such as iron- or slag particles from penetrating into the interior of the bearing.

When, as a consequence of a longitudinal shift $b$ and additionally on account of the influence of heat and plastic deformation, respectively, the trunnion 3 takes an inclined position, i.e., when $\beta$ becomes a maximum, which is indicated in FIG. 5 by $+\beta$, which means that the maximum deflection occurs, the bearing axis 34' remains absolutely vertical, while the axes 46, 47 shift through the centers of the rollers 37 into the position 46', 47'. In a support according to the invention, this shift is, however, so small on the loose bearing side that the outer ring 36 of the bearing 5 need not be wider than the outer ring of bearing 6. If, during operation of the converter, extreme deformations of the carrying ring 2 and/or of the trunnions 3, 4 occur, the link support 12 can be shifted horizontally in the previously described manner, until it is again in alignment with the vertical axis of the bearing 5.

From the kinematics, illustrated in FIG. 4, the progress of the bearing construction according to the invention, compared to the known construction with link support, becomes obvious. If one does not use a joint between the link support and bearing, and a connecting rod, the link support and the bearing housing take the position 34", drawn in broken lines, and the angle becomes $\alpha''$. In that case the sliding, ball and socket, or roller bearing 5 and its outer ring 36, respectively, have to be laid out for a deflection by the angle $(\alpha'' - \beta)$ and have to be considerably wider, because $(\alpha'' - \beta)$ is bigger than $\beta$.

What we claim is:

1. A bearing support structure for tiltable converters with turning and supporting trunnions lying opposite each other and being borne by bearings in bearing housings that accommodate angular and tumble movements, comprising:
 a stationary support on which one bearing housing is mounted;
 a link support on which the other bearing housing is mounted, said link support being articulately connected to the bearing housing;
 a connecting rod arranged in parallel relation to said link support; and
 means for articulately connecting said link support to said connecting rod in such a way as to keep them in parallel relation to each other.

2. The bearing construction set forth in claim 1, wherein the bearings are sliding bearings.

3. The bearing construction set forth in claim 1, wherein the bearings are ball and socket- bearings.

4. The bearing construction set forth in claim 1, wherein the bearings are roller bearings.

5. A bearing support structure as claimed in claim 1 in which said bearings are identical.

6. A bearing support structure for tiltable converters with turning and supporting trunnions lying opposite each other and being borne by bearings in bearing housings that accommodate angular and tumble movements, comprising:
 a stationary support on which one bearing housing is mounted;
 a support plate on which the other bearing housing is mounted;
 a link support having an upper end and a lower end, the upper end of said link support being articulately connected to said support plate;
 a connecting rod having an upper end and a lower end, the upper end of said connecting rod being articulately connected to said support plate; and
 means for maintaining said connecting rod in parallel relation to said link support.

7. A bearing support structure as claimed in claim 6 in which said bearings are identical.

8. A bearing support structure for tiltable converters with turning and supporting trunnions lying opposite each other and being borne by bearings in bearing housings that accommodate angular and tumble movements, comprising:
 a stationary support on which one bearing housing is mounted;
 a horizontally displaceable support plate;
 a link support having an upper end and a lower end, the upper end being articulately connected to the other bearing housing and the lower end of said link support being articulately connected to said displaceable support plate; and
 a connecting rod having an upper end and a lower end, the upper end of said connecting rod being articulately connected to the other bearing housing and the lower end of said connecting rod being articulately connected to said displaceable support plate, the connections of said link support and said connecting rod to said other bearing and to said displaceable support plate being such as to maintain said connecting rod in parallel relation to said link support.

9. A bearing support structure as claimed in claim 8 in which said bearings are identical.

* * * * *